US007749305B1

(12) United States Patent  (10) Patent No.: US 7,749,305 B1
Bossard et al.  (45) Date of Patent: Jul. 6, 2010

(54) COMPOSITE STRUCTURE FOR HIGH EFFICIENCY HYDROGEN SEPARATION CONTAINING PREFORMED NANO-PARTICLES IN A BONDED LAYER

(76) Inventors: Peter R. Bossard, 106 Railroad Dr., Ivyland, PA (US) 18974; Jacques Mettes, 660 Gillespie Dr., Boulder, CO (US) 80305

( * ) Notice: Subject to any disclaimer, the term of this patent is extended or adjusted under 35 U.S.C. 154(b) by 746 days.

(21) Appl. No.: 11/515,976

(22) Filed: Sep. 3, 2006

Related U.S. Application Data

(63) Continuation-in-part of application No. 10/770,732, filed on Feb. 2, 2004, now Pat. No. 7,125,440.

(60) Provisional application No. 60/475,620, filed on Jun. 4, 2003.

(51) Int. Cl.
B01D 59/12 (2006.01)
(52) U.S. Cl. .................. 95/55; 95/43; 95/45; 95/56; 96/4; 96/11; 429/17
(58) Field of Classification Search ............ 95/55, 95/45, 43, 56; 96/4, 11; 429/17; 55/488
See application file for complete search history.

(56) References Cited

U.S. PATENT DOCUMENTS

| | | | |
|---|---|---|---|
| 4,699,637 A | 10/1987 | Iniotakis et al. ........... 55/158 |
| 5,279,731 A * | 1/1994 | Cook et al. ............... 210/232 |
| 5,498,278 A * | 3/1996 | Edlund ..................... 96/11 |
| 5,614,001 A | 3/1997 | Kosaka et al. .............. 96/10 |
| 5,734,092 A | 3/1998 | Wang et al. ............. 73/23.25 |
| 6,152,987 A | 11/2000 | Ma et al. .................. 95/56 |
| 6,589,312 B1 * | 7/2003 | Snow et al. ............... 75/255 |
| 6,964,697 B2 * | 11/2005 | Pan et al. .................. 96/10 |
| 2002/0141919 A1 * | 10/2002 | Alvin ..................... 422/211 |
| 2002/0141920 A1 * | 10/2002 | Alvin et al. ............... 422/211 |
| 2003/0190486 A1 | 10/2003 | Roa et al. |
| 2004/0237779 A1 | 12/2004 | Ma et al. |

FOREIGN PATENT DOCUMENTS

WO  WO 03011433 A1 * 2/2003

* cited by examiner

*Primary Examiner*—Jason M Greene
*Assistant Examiner*—Anthony Shumate
(74) *Attorney, Agent, or Firm*—LaMorte & Associates (57) ABSTRACT

A hydrogen purification system and method that utilizes a hydrogen separator with a novel composite structure. The hydrogen separator has a first porous layer of a hydrogen permeable material. The first porous layer is comprised of premanufactured nano-particles of hydrogen permeable material that have been bonded together. A solid layer of the same hydrogen permeable material is then disposed onto the first porous layer. A pressure differential is created across the structure of the composite hydrogen separator. The porous layer of hydrogen permeable material supports the solid layer and enables the solid layer to withstand large pressure differentials. Furthermore, the porous layer of the hydrogen permeable material bonds to the solid layer, thereby greatly increasing the effective surface area of the solid layer that is exposed to hydrogen gas. Accordingly, a large flow rate of hydrogen gas can be obtained in a small amount of space.

12 Claims, 11 Drawing Sheets

COMPOSITE STRUCTURE FOR HIGH EFFICIENCY HYDROGEN SEPARATION CONTAINING PREFORMED NANO-PARTICLES IN A BONDED LAYER

RELATED APPLICATIONS

This application is a continuation-in-part of application No, 10/770,732 filed Feb. 2, 2004 now U.S. Pat. No. 7,125,440, also entitled Composite Structure For High Efficiency Hydrogen Separation And Its Associated Methods Of Manufacture And Use, which claimed priority of Provisional Patent Application No. 60/475,620 entitled Composite Nano-Structure For High Efficiency Hydrogen Separation, which was executed on Jun. 4, 2003.

BACKGROUND OF THE INVENTION

1. Field of the Invention

The present invention relates to systems and methods that are used to separate molecular hydrogen from a volume of gas. More particularly, the present invention is related to systems and methods that separate hydrogen from a volume of mixed gas by exposing the mixed gas to a hydrogen permeable material through which only atomic hydrogen can readily pass.

2. Description of the Prior Art

In industry there are many applications for the use of molecular hydrogen. However, in many common processes that produce hydrogen, the hydrogen gas produced is not pure. Rather, when hydrogen is produced, the resultant gas is often contaminated with water vapor, hydrocarbons and/or other contaminants. In many instances, however, it is desired to have ultra pure hydrogen. In the art, ultra pure hydrogen is commonly considered to be hydrogen having purity levels of at least 99.999%. In order to achieve such purity levels, hydrogen gas must be actively separated from its contaminants.

In the prior art, one of the most common ways to purify contaminated hydrogen gas is to pass the gas through a conduit made of a hydrogen permeable material, such as palladium or a palladium alloy. As the contaminated hydrogen gas passes through the conduit, atomic hydrogen permeates through the walls of the conduit, thereby separating from the contaminants. In such prior art processes, the conduit is kept internally pressurized and is typically heated to at least three hundred degrees centigrade. Within the conduit, molecular hydrogen disassociates into atomic hydrogen on the surface of the conduit and the conduit absorbs the atomic hydrogen. The atomic hydrogen permeates through the conduit from a high pressure side of the conduit to a low pressure side of the conduit. Once at the low pressure side of the conduit, the atomic hydrogen recombines to form molecular hydrogen. The molecular hydrogen that passes through the walls of the conduit can then be collected for use. Such prior art systems are exemplified by U.S. Pat. No. 5,614,001 to Kosaka et al., entitled Hydrogen Separator, Hydrogen Separating Apparatus And Method For Manufacturing Hydrogen Separator.

The flow rate of hydrogen gas through the walls of a conduit is proportional to the length of the conduit and the thickness of the walls of the conduit. Thus, a highly efficient purification system would have a very long, very thin conduit to maximize flow rate. However, palladium is a very expensive precious metal. Consequently, conduits made of palladium and palladium alloys are very expensive to manufacture. As such, it is desirable to use as little of the palladium as possible in manufacturing a hydrogen gas purification system. Furthermore, conduits made from palladium and palladium alloys typically hold gas under pressure and at high temperatures. Accordingly, the walls of the conduit cannot be made too thin, else the conduit will either rupture or collapse depending on the pressure gradient present across the wall of the conduit.

A typical prior art conduit made from palladium or a palladium alloy would have a wall thickness of approximately 80 µm. The thickness of the wall of the conduit is inversely proportional to the amount of purified hydrogen that passes through that wall in a given period of time. As such, in order to make the conduit more efficient, a thinner wall is desirable. However, as has already been stated, a conduit wall cannot be made so thin that it ruptures or collapses under the pressure of the gases being passed through that conduit.

To further complicate matters, conduits made from palladium and palladium alloys may become less efficient over time as the interior walls of the conduits become clogged with contaminants. In order to elongate the life of such conduits, many manufacturers attempt to clean the conduits by reverse pressurizing the conduits. In such a procedure, the exterior of the conduit is exposed to pressurized hydrogen. The hydrogen passes through the conduit wall and into the interior of the conduit. As the hydrogen passes into the interior of the conduit, the hydrogen may remove some of the contaminants that were deposited on the interior wall of the conduit.

Due to the generally cylindrical shape of most prior art hydrogen purification conduits, the conduits are capable of withstanding a fairly high pressure gradient when the interior of the conduit is pressurized higher than the exterior of the conduit. However, when such conduits are cleaned and the external pressure of the conduit is raised higher than the interior pressure, a much lower pressure gradient must be used, else the conduit will implode.

In the prior art, improved conduit designs have been developed that attempt to minimize the amount of palladium used in a conduit, yet increase the strength of the conduit. One such prior art device is shown in U.S. Pat. No. 4,699,637 to Iniotakis, entitled Hydrogen Permeation Membrane. In the Iniotakis patent, a thin layer of palladium is reinforced between two layers of mesh. The laminar structure is then rolled into a conduit. Such a structure uses less palladium. However, the conduit is incapable of holding the same pressure gradient as solid palladium conduits. Accordingly, the increase in efficiency provided by the thinner palladium layer is partially offset by the decreased pressure limits, and thus gas flow rate, that are capable of being processed.

Another prior art approach to limiting the amount of palladium used is to create membranes that are placed over apertures, like a skin on a drum. A pressure gradient is then created on opposite sides of the membrane, thereby causing hydrogen to flow through the membrane. Such prior art systems are exemplified by U.S. Pat. No. 5,734,092 to Wang et al., entitled Planar Palladium Structure. A problem associated with such prior art systems is that the palladium or palladium alloy membrane is typically positioned in a level plane, wherein a pressure gradient exists from one side of the membrane to the other. Since the membrane is flat, it has little structural integrity when trying to resist the forces created by the pressure gradient. Accordingly, in order to prevent the membrane from rupturing, solid perforated substrates are used to reinforce the membrane. The solid perforated substrates, however, are complicated to manufacture, restrict the flow through the membrane, and reduce the efficiency of the overall system.

U.S. Pat. No. 6,152,987 to Ma, entitled Hydrogen Gas-Extraction Module And Method Of Fabrication, discloses a hydrogen separator where a solid layer of hydrogen permeable material is deposited over a porous substrate of dissimilar material. The porous substrate supports the hydrogen permeable material and provides much more support than prior art mesh support systems. However, the porous substrate only allows gas to contact the hydrogen permeable material where a pore gap is exposed to the hydrogen permeable material. This configuration greatly limits the area of hydrogen permeable material actually exposed to gas. Furthermore, due to differences in thermal coefficients and other physical properties, hydrogen permeable material deposited on a substrate of a dissimilar material tends to separate from the substrate. This can cause leakage of contaminated gas through the hydrogen permeable material and the eventual failure of the system.

U.S. Patent Application No. 2003/0190486 to Roa et al, also discloses a hydrogen separator where a solid layer of hydrogen permeable material is deposited over a porous substrate of dissimilar material. In the Roa application, a palladium alloy is deposited over the porous substrate of dissimilar material using a first electroplating process. Copper is then deposited on the palladium in a second electroplating process. The palladium and copper layers are then annealed to produce a palladium alloy in place on the substrate. However, the porous substrate only allows gas to contact the hydrogen permeable material where a pore gap is exposed to the hydrogen permeable material. This configuration greatly limits the area of hydrogen permeable material actually exposed to gas.

Furthermore, palladium alloy does not bond well to the porous substrate of dissimilar material. This leads to eventual failure. In prior art systems, such as the previously cited Ma patent and the Roa application, where palladium alloy is deposited directly on a porous substrate, another problem is that the substrates have large pore sizes to maximize exposure of the palladium alloy to gas. This requires that thick uneven layers of palladium be deposited over the porous substrate to cover the pores of the substrate. This causes faults in the layer of palladium that tend to fail over time.

Attempts have been made to eliminate these problems by creating a porous structure of a palladium alloy and then coating this porous structure with a solid layer of the same palladium alloy. In U.S. Patent Application Publication No. 2004/0237779 to Ma, entitled Composite Gas Separation Modules Having Intermediate Porous Metal Layers, a porous stainless steel substrate is provided. A porous intermediate layer of palladium alloy is the created by electroplating the palladium alloy directly onto the stainless steel. Finally, a solid layer of palladium alloy is deposited onto the porous intermediate layer.

In such systems, the porous layer of palladium alloy is still deposited directly onto the porous substrate of dissimilar material. The dissimilar materials bond poorly resulting in many eventual detachment flaws. More importantly, the intermediate palladium alloy layer is deposited using electroplating techniques. In electroplating, ions of a metal are draw through an electroplating solution. Such an electroplating solution contains hydrocarbons. As the ions of palladium alloy are deposited onto the porous stainless steel substrate, the deposited particles of palladium alloy tend to become coated in carbon from the electroplating solution. The carbon coating on the deposited particles of palladium alloy prevent hydrogen from being able to permeate through the palladium alloy. Rather, the carbon acts as a physical barrier between the palladium alloy and the hydrogen. This greatly inhibits the performance of the hydrogen separator.

A need therefore exists in the art of hydrogen purification for a system and method that can handle high flow rates of gas, per unit area, and yet uses only a minimal amount of hydrogen permeable material. A need also exists for a hydrogen purification system with a hydrogen permeable layer that is strongly bonded to its supporting substrate and unobstructed by carbon, so that it can more reliably pass hydrogen while withstanding large pressure gradients and repeated temperature cycles over longer periods of time. These needs are met by the present invention as described and claimed below.

SUMMARY OF THE INVENTION

The present invention is a hydrogen purification system and method that utilizes a novel composite hydrogen separator. The composite hydrogen separator has a porous substrate. A first porous layer of a hydrogen permeable material is deposited in the porous substrate. The first porous layer includes premanufactured nano-particles of hydrogen permeable material that are deposited on a porous substrate in such a manner that the resultant layer of nano particles has the same physical structure as that of stack cannon balls. This results in a nano particle layer that is completely porous which means there are no-dead ends when molecules of gas are required to transition this layer.

The nano particles can be made with a high temperature "ink jet printer type" of head and electrostatically deposited on the substrate with the appropriate amount of kinetic energy for set temperatures of the substrate and the source of nano particle so the resulting structure was the stacked cannon ball model.

Any technique that will successfully build this composite nano structure requires a reasonably good vacuum system ($<10^{-3}$ torr) for processing, without a good vacuum system—oxidation and other contamination will prevent the resulting structure from working. The connection between nano particles and the solid layer will have contamination that will block the interface between the composite nano particles and a solid hydrogen permeable layer.

Regardless of its method of construction, the porous layer of hydrogen permeable material supports the solid layer and enables the solid layer to withstand large pressure differentials. Furthermore, the porous layer of the hydrogen permeable material is diffusion bonded to the solid layer, thereby greatly increasing the effective surface area of the solid layer that is exposed to hydrogen gas. Accordingly, a large flow rate of hydrogen gas can be obtained in a small amount of space.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention system provides a means for purifying a hydrogen gas at a high flow rate, using a small amount of space and a small amount of precious metals.

Figure 1:
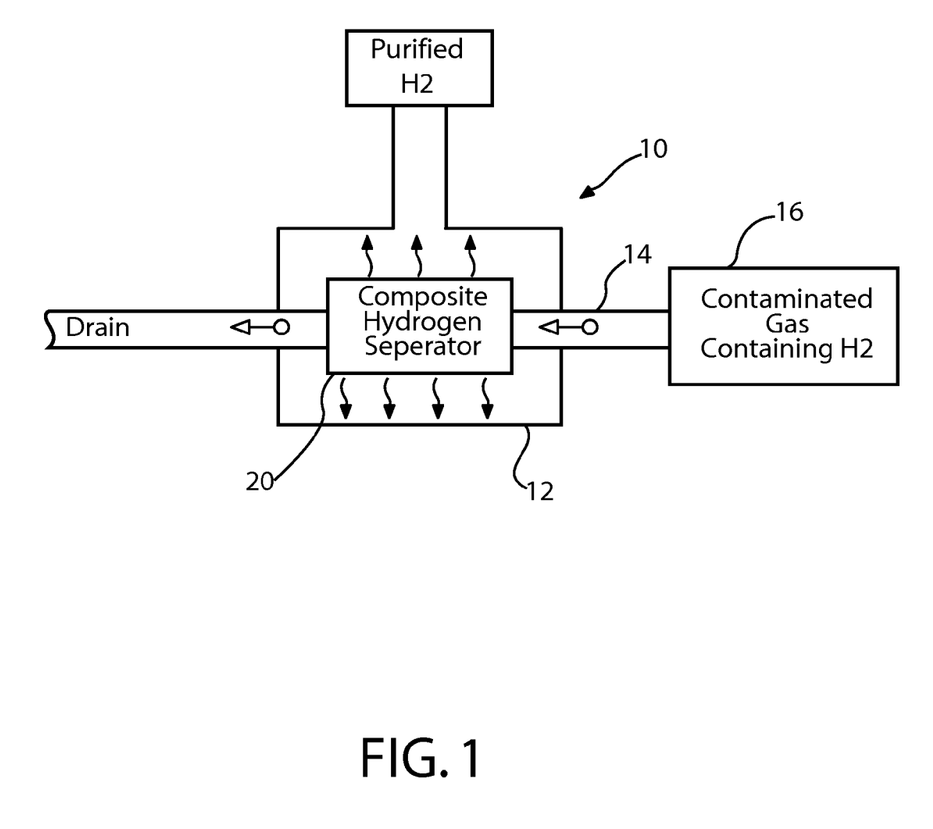
FIG. 1 is a schematic of an exemplary embodiment of a hydrogen purification system.

Referring to FIG. 1, there is shown a schematic of an exemplary embodiment of a hydrogen purification system 10 in accordance with the present invention. The hydrogen purification system 10 contains a collection chamber 12 for collecting purified hydrogen gas. At least one supply conduit 14 extends into the collection chamber 12 where each of the supply conduits 14 is coupled to a source of contaminated hydrogen gas 16. The supply conduit 14 is mostly fabricated from stainless steel or an equivalent alloy that is capable of retaining the contaminated hydrogen gas at a first pressure and at a predetermined operating temperature of at least three hundred degrees centigrade.

Along the supply conduit 14 is disposed a composite hydrogen separator 20. The composite hydrogen separator 20 enables only pure hydrogen gas to permeate out of the supply conduit 14 and into the collection chamber 12. Once, the purified hydrogen enters the collection chamber 12 it is collected for use.

The composite hydrogen separator 20 is the only part of the purification system 10 that is permeable to hydrogen gas. As such, the flow capacity of the overall purification system 10 relies completely upon the flow capacity characteristics of the composite hydrogen separator 20.

Figure 2:
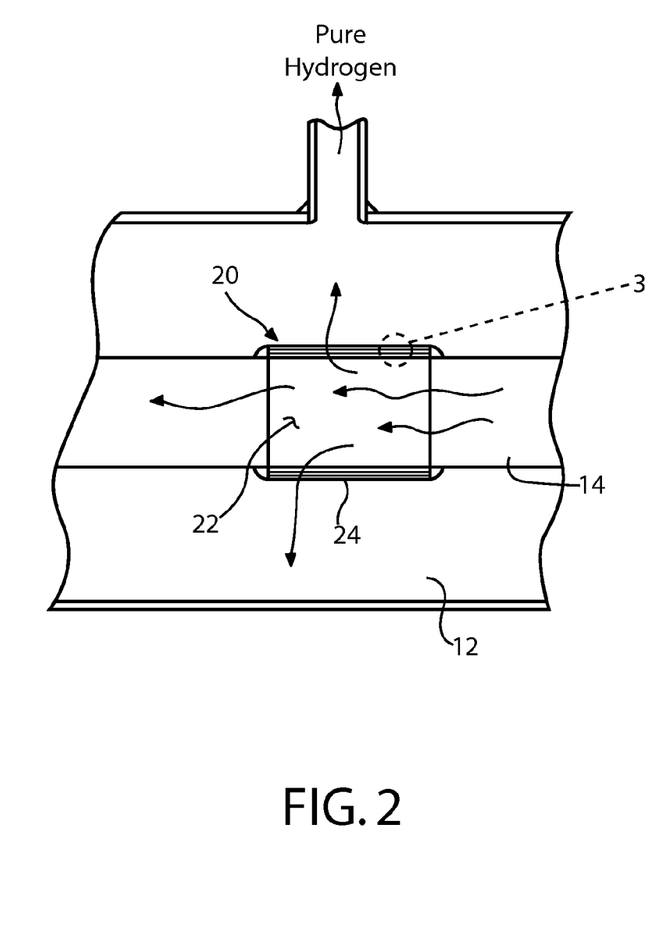
FIG. 2 is a fragmented view of an exemplary embodiment of a composite hydrogen separator.

Referring to FIG. 2, it can be seen that the example of the composite hydrogen separator 20 that is illustrated is tubular in shape, wherein it defines an open central conduit 22. The composite hydrogen separator 20 is attached to the supply conduit 14. Contaminated hydrogen gas under pressure is passed through the central conduit 22 in the center of the composite hydrogen separator 20. The pressure in the surrounding collection chamber 12 is kept lower than the pressure within the central conduit 22. As such, a pressure differential exists across the wall 24 of the composite hydrogen separator 20 that causes hydrogen gas to permeate through the structure of the composite hydrogen separator 20. The greater the pressure differential between the conduit 22 in the composite hydrogen separator 20 and the collection chamber 12, the greater the rate of flow of hydrogen out of the composite hydrogen separator 20.

The direction of the flow can be controlled by selectively changing the direction of the pressure differential between the collection chamber 12 and the conduit 22 within the composite hydrogen separator 20. Under normal operating conditions, the pressure within the composite hydrogen separator 20 is kept greater than the pressure within the collection chamber 12. As such, hydrogen gas flows out of the composite hydrogen separator 20 and is purified. However, during maintenance cycles, the pressure of hydrogen gas within the collection chamber 12 can be made greater than the pressure of hydrogen within the composite hydrogen separator 20. In this circumstance, the hydrogen gas flows from the collection chamber 12 into the composite hydrogen separator 20 and can be used to remove contaminants that may have collected on the interior surfaces of the wall 24 of the composite hydrogen separator 20.

Figure 3:
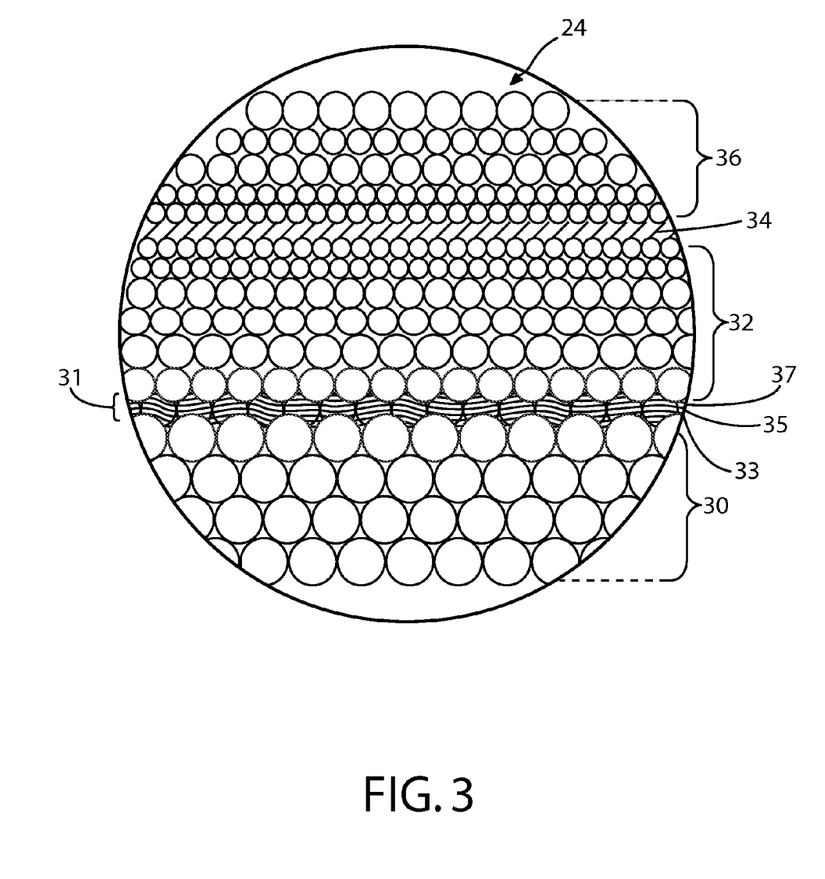
FIG. 3 is an enlarged view of section 3 previously shown in FIG. 2.

The wall 24 of the composite hydrogen separator 20 has a composite structure that is made using a unique combination of formation processes and techniques. Referring to FIG. 3, an enlarged segment of FIG. 2 is shown. From FIG. 3, it can be seen that the composition of the wall 24 of the composite hydrogen separator 20 changes across the thickness of the wall 24. As such, the wall 24 is a composite structure of different materials.

The first layer of the wall is the supporting base layer 30. The base layer 30 is made of a non-reactive metal or metal alloy that in itself is not hydrogen permeable. In a preferred embodiment, the material selected for the base layer is stainless steel, tungsten or molybdenum. However, the base layer 30 of the wall 24 is porous and allows hydrogen gas to freely pass through the pores of its structure. As will later be explained in more detail, the base layer 30 is made using traditional powder metallurgy techniques, where a powder of the non-reactive metal or alloy is formed into the desired shape and sintered into a porous form. Preferably, the base layer 30 is manufactured so that it has pore size of approximately 0.7 µm prior to sintering. However, larger and smaller pore sizes can be used.

To promote strong bonding to the porous base layer 30, at least one bonding layer 31 is deposited onto the base layer 30. In the exemplary embodiment, three bonding layers 31 are used. The bonding layers 31 are thin so that they do not close the pores in the base layer 30. The first bonding layer 33 is preferably nickel or chromium. Such metal bond well to stainless steel alloys. The first bonding layer 33 is deposited directly onto the metal of the base layer 30. The first bonding layer 33 bonds with the metal of the base layer 30, as will later be explained.

The second bonding layer 35 is a layer of tungsten or a metal from the same periodic family. The tungsten is deposited over the first bonding layer 33 and bonds to the material of the first bonding layer 33.

The third bonding layer 37 is a layer of copper or silver, depending upon the hydrogen permeable alloy to be used in the hydrogen separator 20. If a palladium-silver alloy is used, silver is used as the third bonding layer 37. However, it is preferred that a palladium-copper alloy be used. As such, copper is preferably used as the third bonding layer 37. The silver or copper acts as a wetting layer in that it covers the second bonding layer 35 of tungsten and provides a surface onto which a palladium alloy can directly diffusion bond.

Although three bonding layers are illustrated, its should be understood that only one bonding layer need be present, provided the single bonding layer bonds to both the porous base layer 30 and the material of the first porous layer 32

A first porous layer 32 of hydrogen permeable material is formed upon the bonding layers 31. The first porous hydrogen permeable layer 32 is preferably made from prefabricated nano particles of a hydrogen permeable material. The hydrogen permeable material can be a palladium alloy, such as $Pd_{1-x}Ag_x$ or $Pd_{1-x}Cu_x$. However, other known hydrogen permeable alloys can also be used. Such alloys include, but are not limited to PdRu, PdAu, PdNi, PdFe, Niobium alloys, Tantalum alloys and Vanadium alloys. The nano particles of the hydrogen permeable material can be uniform in material.

Alternatively, the nano particles can be ceramic balls that are coated with a hydrogen permeable material.

The first porous layer 32 can be made from nano particles of a single size. However, in a preferred embodiment, the size of the palladium alloy nano particles in the first porous layer are graduated. As such, the palladium alloy nano particles become smaller the further those nano particles are from the bonding layers 31 and the base layer 30. The first porous hydrogen permeable layer 32 can be formed in different ways, as will be later described.

A solid layer 34 of palladium alloy or another hydrogen permeable material is deposited over the first porous hydrogen permeable layer 32 using one of the techniques later described. The hydrogen permeable material selected for the solid layer 34 is preferably the same material selected for the first porous hydrogen permeable layer 32. In this manner, the solid layer 34 and the first porous hydrogen permeable layer 32 share physical characteristics, such as thermal expansion. Furthermore, by using the same hydrogen permeable material, the solid layer 24 of hydrogen permeable material can be diffusion bonded to the first porous hydrogen permeable layer 32.

The deposited solid layer 34 of hydrogen permeable material is preferably between 0.05 microns and 0.20 microns thick. The deposited solid layer 34 diffusion bonds with the first porous hydrogen permeable layer 32. However, the deposited solid layer 34 seals the pores of the first porous hydrogen permeable layer 32. As such, any hydrogen gas traveling through the wall 24 of the composite hydrogen separator 20 must permeate through the deposited solid layer 34 in order to advance.

Above the deposited solid layer 34 of hydrogen permeable material is a second porous hydrogen permeable layer 36. The second porous hydrogen permeable layer 36 is also made of the same hydrogen permeable material as the solid layer 34. However, the second porous hydrogen permeable layer 36 is manufactured to be porous. As such, the deposited solid layer 34 of hydrogen permeable material is interposed in between two porous layers 32, 36 of hydrogen permeable material.

The base layer 30 of non-reactive metal at the bottom of the wall 24 provides the wall 24 of the composite hydrogen separator 20 with physical strength. This base layer 30 prevents the composite hydrogen separator 20 from being easily inwardly crushed or outwardly expanded. Accordingly, the composite hydrogen separator 20 can withstand large pressure differentials without inwardly or outwardly deforming.

The first porous hydrogen permeable layer 32 and the second porous hydrogen permeable layer 36 serve two purposes. First, these layers physically support the deposited solid layer 34 of hydrogen permeable material on either side of the solid layer 34. Accordingly, the solid layer 34 of hydrogen permeable material is fully supported at nearly all points along its surface. However, although most all points of the solid layer 34 are supported, the entire solid layer 34 remains active in the permeation of hydrogen gas because the supporting porous layers 32, 36 are also completely permeable to hydrogen gas. The solid layer 34 of hydrogen permeable material can therefore withstand very large pressure differentials between the sides of the solid layer 34 without rupturing.

The first porous hydrogen permeable layer 32 and the second porous hydrogen permeable layer 36 do not obstruct the surface area of the solid layer 34 that is exposed to hydrogen gas. In fact, these porous layers 32, 36 actually increase the effective surface area of the solid layer 34. The first porous hydrogen permeable layer 32 and the second porous hydrogen permeable layer 36 are preferable made of the same material as the deposited solid layer 34. The contact of the first porous hydrogen permeable layer 32 and the second porous hydrogen permeable layer 36 against the solid layer 34 therefore has the same effect as manufacturing the solid layer 34 with highly textured surfaces. This greatly increases the effective surface area that is exposed to hydrogen gas trying to permeate through the solid layer 34.

Referring to FIG. 2 in conjunction with FIG. 3, it will be understood that, in operation, contaminated gas enters the conduit 22 in the center of the composite hydrogen separator 20. The contaminated gas passes through the pores in the base layer 30 of the wall 24. The contaminated gas also passes through the pores in the first porous hydrogen permeable layer 32 until it contacts the deposited solid layer 34. The deposited solid layer 34 blocks all gases except hydrogen. The hydrogen permeates through the solid layer 34 where the hydrogen gas directly contacts the solid layer 34. However, the hydrogen gas can also permeate into the areas of the first porous hydrogen permeable layer 32 that are contacting and supporting the deposited solid layer 34. As a result, a very large surface area is available through which hydrogen gas can pass.

Once the hydrogen gas permeates across the deposited solid layer 34, it enters the second porous hydrogen permeable layer 36. The second porous hydrogen permeable layer 36 provides very little resistance to the further passage of the now purified hydrogen gas into the surrounding collection chamber 12.

When the composite hydrogen separator 20 is being cleaned, pressure differentials are reversed. The second porous hydrogen permeable layer 36 then acts to increase the effective surface area of the deposited solid layer 34 as hydrogen gas flows into the composite hydrogen separator 20 toward the central conduit 22.

Example of a Microstructure Composition for a Hydrogen Separation Membrane

Figure 4:
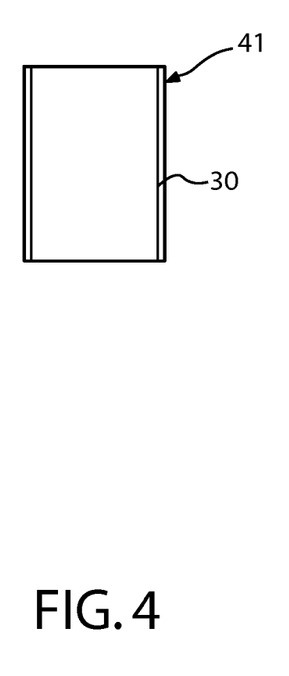
FIG. 4 is a cross-sectional view of the base layer used in an exemplary embodiment of the present invention.

As has been previously mentioned, various layers of the wall 24 of the composite hydrogen separator 20 can be made in different ways. Referring to FIG. 4, it will be understood that the base layer 30 is preferably a sintered metal that is sintered into a porous form having a pore size of approximately 0.5 µm to 0.9 µm. An average pore size of 0.7 µm being preferred and used by way of example. Because of the overall process flexibility and geometric scaling, there is a considerable variation in possible average pore diameter. The base layer 30 can be sintered in the desired form 41 or a sintered block can be machined into the desired base form 41. In the shown example, the desired base form 41 is a tubular section.

Figure 5:
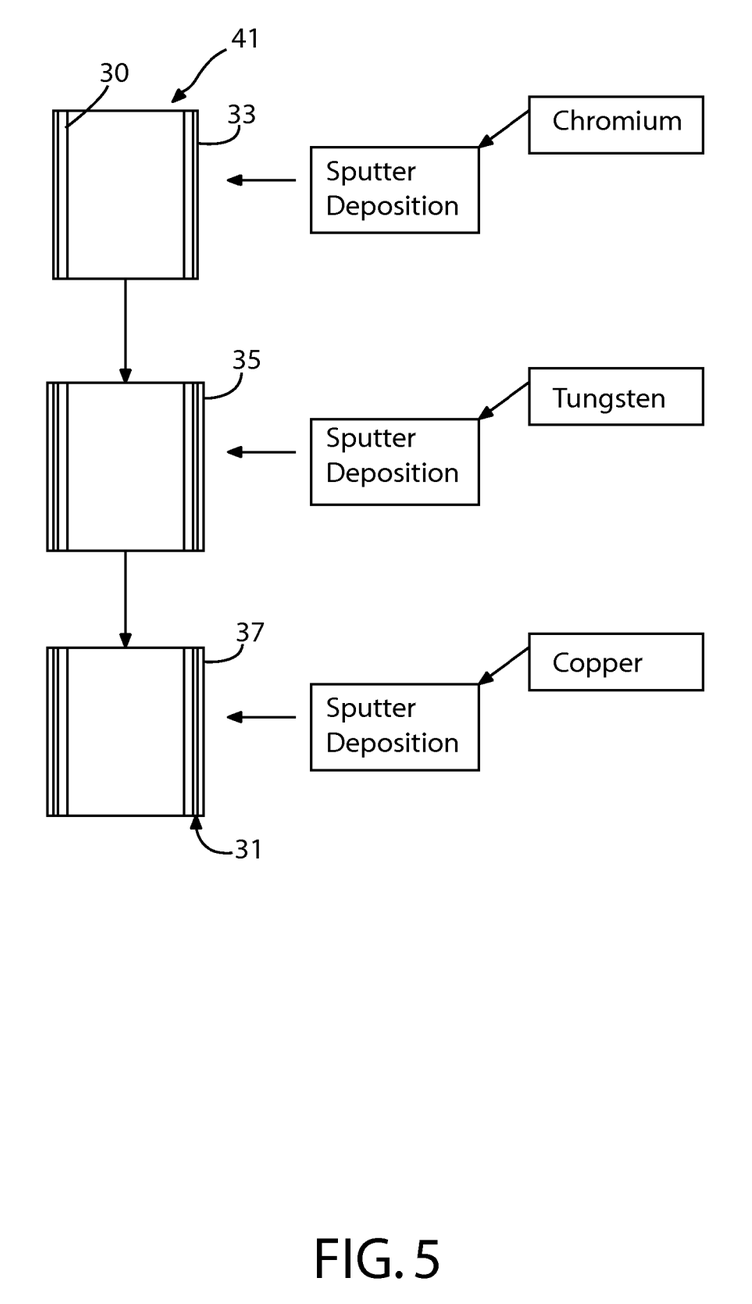
FIG. 5 is a schematic of a manufacturing step used in production of an exemplary embodiment of the present invention.

Referring to FIG. 5, it can be seen that individual bonding layers 33, 35, 37 are preferably deposited onto the base layer 30 using biased substrate sputtering, where the base layer 30 is the substrate. The base form 41 is placed in a vacuum deposition chamber, wherein each of the individual bonding layers 33, 35, 37 are deposited separately. For the exemplary pore size of 0.7 microns, the first bonding layer 33 of chromium or nickel is deposited in a layer of 0.03 microns. This initial sputtered layer promotes adhesion. The second bonding layer 35 of tungsten is deposited in a layer of 0.10 microns. The second bonding layer 35 of sputtered tungsten is for a diffusion barrier between the first bonding layer 33 and the subsequent third bonding layer 37. The third bonding layer 37 of copper is deposited in a layer of 0.20 microns. The third bonding layer 37 of copper is for diffusion bonded to the porous layers that follow the sputtering process. The thickness of these three initial bonding layers 33, 35, 37 can be adjusted in accordance with the pore size of layer 30. For the case of an average pore size of 0.7 µm, the thickness of the three bonding layers 33, 35, 37 is preferably what is stated in the example.

With the preferred thickness of the individual bonding layers 33, 35, 37 stated, the bonding layers 31 will have a combined thickness of 0.33 microns. The base layer 30 preferably has a pore size of 0.7 microns. As the individual bonding layers 33, 35, 37 are deposited, the pore size present on the exterior of the assembly becomes smaller. The deposition of thin film material onto facing pore surfaces, obtained through substrate biasing, is controlled in a manner consistent with the specific to the vacuum system geometry, power distribution, and operating parameters during plasma sputtering. In the case of the example, the 0.7 micron pores will be reduced in correspondence to the bonding layer thickness of 0.33 microns. The resulting new pore size will be 0.36 microns, or approximately a 50% reduction in diameter. However, the pores do remain open after the combined bonding layers 31 are applied.

From the above discussion, the flexibility in the process can be seen as a direct correspondence between the initial pore size of base layer 30 and the total thickness of the deposited bonding layers 33, 35, 37. Specifically, the larger the initial pore size in the base layer 30, the thicker the layer of deposited bonding layers 33, 35, 37, since the pore size can be controlled by the thickness of the bonding layers 33, 35, 37. The thickness of the bonding layers 33, 35, 37 may be approximately proportional to the original thickness stated for he base layer 30.

It will be understood that the materials described for the bonding layers 33, 35, 37 are exemplary and can be changed. For instance, the first two bonding layers 33, 35 can be made from material that is not hydrogen permeable. The third bonding layer 37 can be made permeable to hydrogen by forming an alloy with subsequent layers for diffusion bonding.

Figure 6:
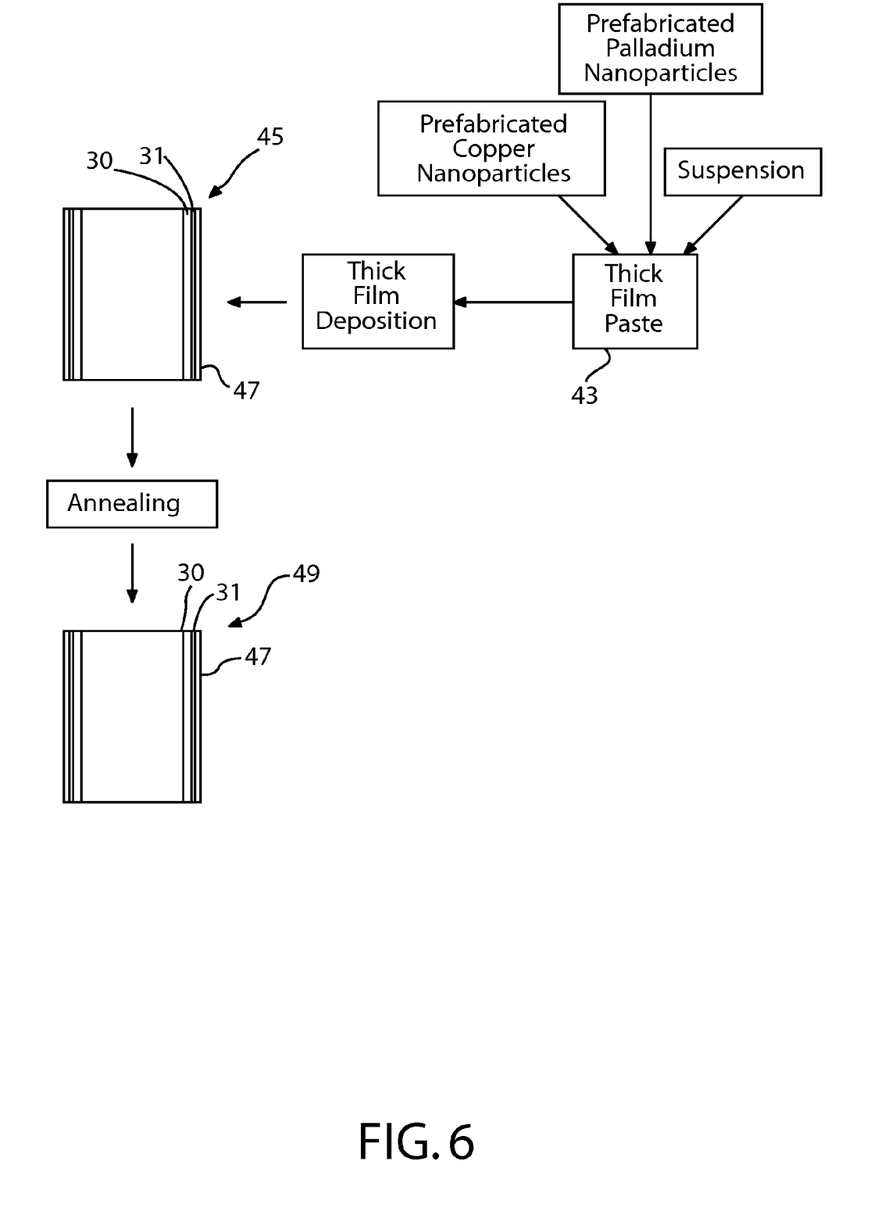
FIG. 6 is a schematic of a manufacturing step used in production of an exemplary embodiment of the present invention.

Referring to FIG. 6, it can be seen that the first porous hydrogen permeable layer 32 is deposited over the bonding layers 33, 35, 37. The first porous hydrogen permeable layer 32 is made of nano-particles of hydrogen permeable material. The nano-particles are prefabricated prior to use within the present invention. By manufacturing the nano-particles separately, the size and quality of the nano-particles can be controlled with great precision.

The prefabricated nano-particles that form the first hydrogen permeable layer 32 can be deposited over the bonding layers 33, 35, 37 in a variety of ways. In the shown manufacturing method, nano-particles of palladium and copper are suspended in a rheological vehicle, such as Hereaus-Cermalloy V633 or V636. Such rheological vehicles are thixotropic agents which are commonly used in nitrogen fireable thick film paste formulations. This suspension forms a thick paste film 43. Using traditional thick film deposition techniques, such as spin coating, ink head printing, spraying or screen printing, the thick film paste 43 is deposited over the bonding layers 31. This creates a wet, four layered slug 45. The prefabricated nano-particles particles of palladium and copper in the thick film paste 43 are larger than the pore openings in the underlying bonding layers 33, 35, 37. Since the nano-particles are prefabricated, they are precise in size and do not fall into any pore opening.

Once the thick film paste 43 is applied, it is fired. In the exemplary case, the firing can be performed at a temperature of 600° C. for several hours in an ambient containing several percent of hydrogen. Within the first thick film layer 47, the firing induces diffusion bonding between the palladium and the copper particles, producing a palladium alloy. The firing also induces diffusion bonding between the bonding layers 31, the base layer 30 with the bonding layers 31, and the bonding layers 31 with the first thick film layer 47. This first thick film layer 47 is then bonded cohesively (sintered) and adhesively to the base layer 30 through bonding layers 31.

After annealing, a five layered slug 49 is created having a porous base layer 30, three bonding layers 31 and the first thick film layer 47 that are all diffusion bonded together.

It will be understood that the first porous layer is comprised of premanufactured palladium alloy nano-particles that are then deposited on a porous substrate in such a manner that the resultant layer of deposited palladium nano particles has the same physical structure as that of stack cannon balls. This results in a palladium nano particle layer that is completely porous which means there are no-dead ends when molecules of gas are required to transition this layer.

The palladium nano-particle deposition process will employ controlled application parameters and a controlled temperature of both the porous substrate and the palladium nano particles that are being deposited before they come in contact with the substrate or other palladium nano-particles on the substrate. This results in a palladium nano particle layer that is completely porous which means there are no-dead ends when molecules of gas are required to transition this layer.

Figure 7:
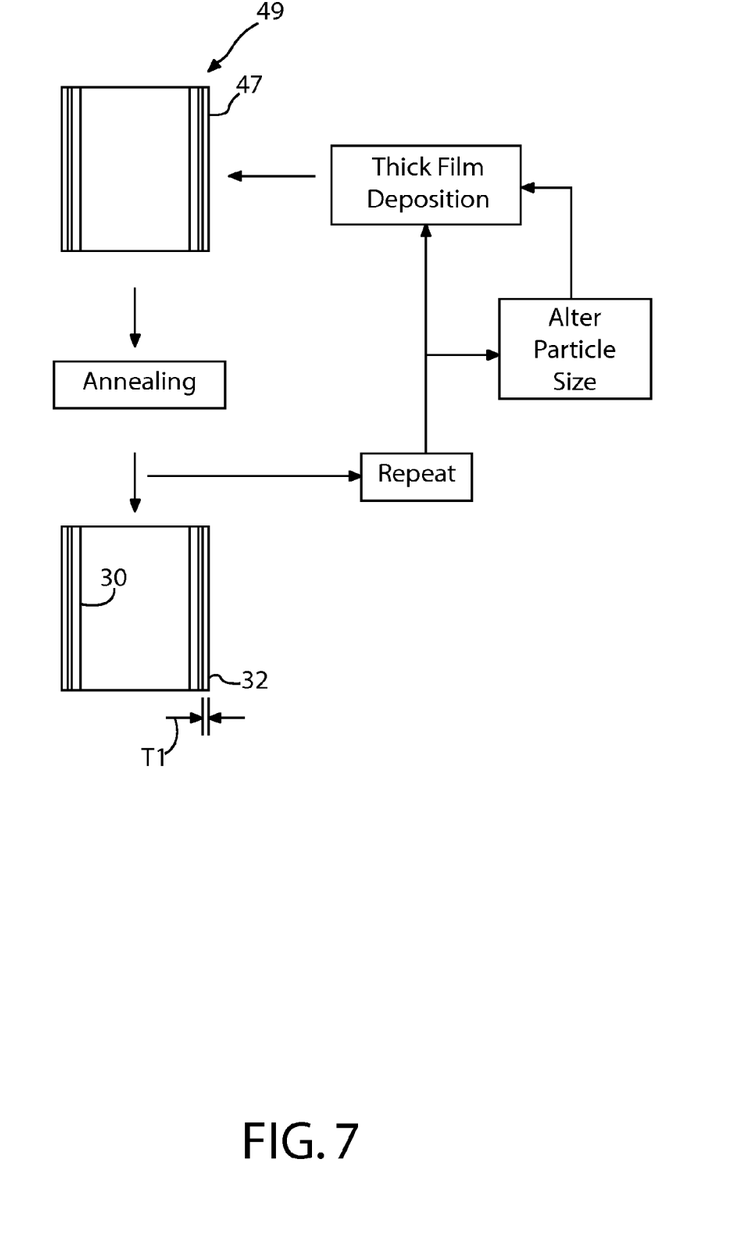
FIG. 7 is a schematic of a manufacturing step used in production of an exemplary embodiment of the present invention.

Referring to FIG. 7, it can be seen that subsequent thick film layers can be deposited over the first thick film layer 47, thereby growing the thickness of that layer. The five layered slug 49 is repeatedly subjected to thick film deposition and sintering. Each time a subsequent thick film layer is deposited, the size of the prefabricated nano-particles used in the thick film paste are decreased, thereby also decreasing the average pore between the particles. The subsequent layers of thick film are fired and the process is repeated until a first porous hydrogen permeable layer 32 is produced. Hence, the first porous hydrogen permeable layer 32 is comprised of a number of sintered nano-particle sub-layers, where the pore size of each subsequent sub-layer is decreased with respect to the prior layer, progressively decreasing until the final sub-layer has a pore size that reaches a designed value.

The designed value of the pore size of the final sub-layer is in accordance with the thickness of the solid palladium layer that will be used. As such, the microstructure of permeable layer 32 as a whole possesses the mechanical strength required to withstand the range of differential pressures across a solid palladium layer while in operation. That is, for small values of differential pressure, a solid palladium layer can be relatively thin, hence the final porous layer should possess a relatively small average pore size in order for the deposition of a solid palladium layer to close the pores. Similarly, for operating with higher differential pressures, a thicker solid palladium layer may be required for mechanical strength, which therefore requires a thicker solid film and a larger pore size can be used. The design of the microstructure accounts for the practical range of operation of a solid palladium layer, while maximizing the permeance of the solid palladium layer by maintaining a minimum thickness of a solid palladium layer for the required mechanical strength. The design is therefore scalable in accordance with the pressure differential required for mechanical strength.

The sub-layers produce a first porous hydrogen permeable layer 32 has a final thickness T1, which is the sum of the annealed thicknesses of all the thick film sub-layers that have been deposited. The first porous hydrogen permeable layer 32 is comprised of a single palladium alloy. However, the particle size and the pore size within the first porous hydrogen permeable layer 32 decreases as a function of distance from the base layer 30. In the outer most application of thick film, it is preferred that the pore size after annealing be between 0.03 microns and 0.05 microns. This pore size produces a relatively smooth surface upon which a solid layer of material can later be deposited.

Figure 8:
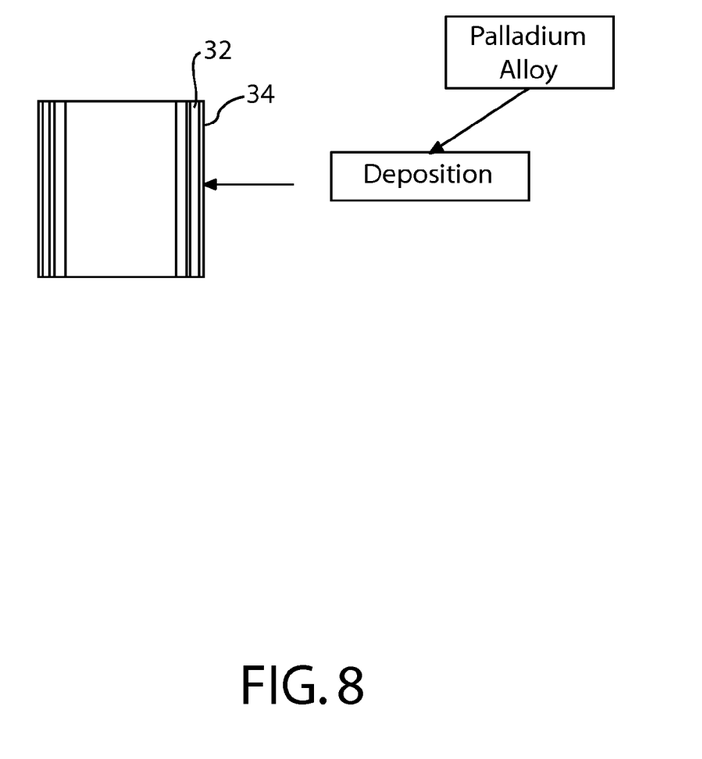
FIG. 8 is a schematic of a manufacturing step used in production of an exemplary embodiment of the present invention.

Referring to FIG. 8, it can be seen that a solid layer 34 of palladium alloy is deposited over the first porous hydrogen permeable layer 32. Many deposition techniques can be used, such as vapor deposition, sputter deposition, spraying, spin coating, dipping, electroplating, or electroless plating. The minimum thickness of the solid layer 34 of palladium alloy is such that the pores are essentially closed after the deposition of the solid layer 34. For bias sputtering, the thickness of the solid layer 34 can be about one-half the average pore size diameter of first porous hydrogen permeable layer 32 under the appropriate sputtering conditions. However, it is preferred that the thickness of the solid layer 34 of palladium be at least as thick as the pore size existing on the exterior of the first porous hydrogen layer 32 in order to compensate for the deviation in the actual pore. The solid layer 34 of palladium alloy seals the pores of the first porous hydrogen permeable layer 32, thereby preventing any contaminant gas from flowing through the wall structure of the hydrogen separator.

Since the size of the prefabricated nano particles used in the first porous hydrogen permeable layer 32 are smallest at its exterior, the surface on which the solid layer 34 is deposited is very even and smooth. The solid layer 34 of palladium covering this smooth layer can therefore be applied in an even layer with relatively small variations and imperfections.

Figure 9:
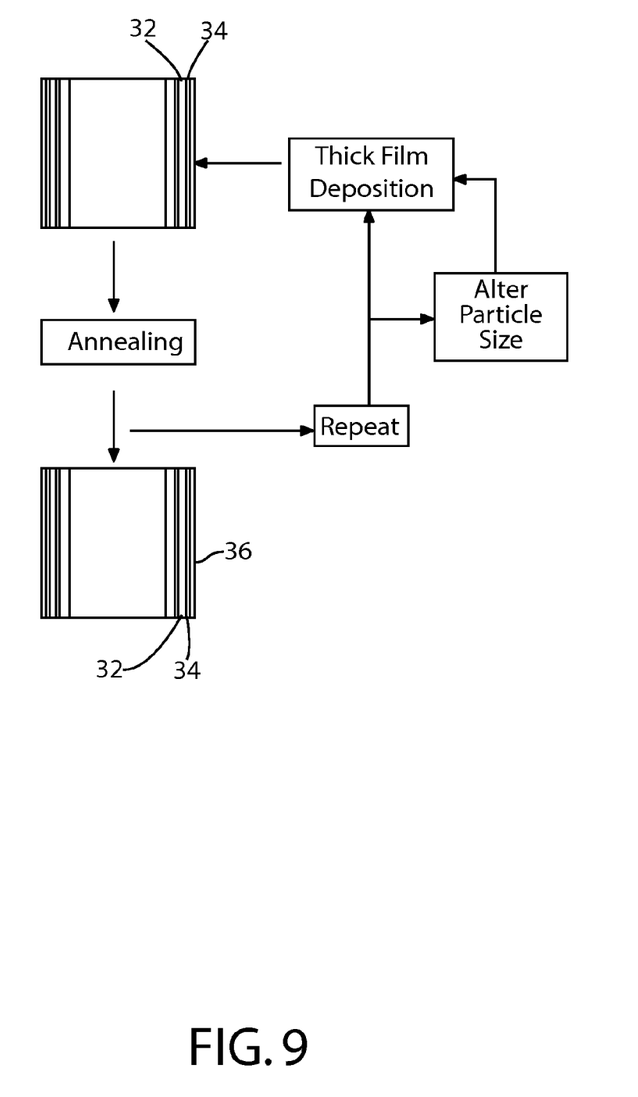
FIG. 9 is a schematic of a manufacturing step used in production of an exemplary embodiment of the present invention.

Referring to FIG. 9, it can be seen that after the solid layer 34 of palladium alloy is deposited, at least one thick film layer of palladium and copper nano-particles are deposited onto the solid layer 34 of palladium alloy. Again, the nano-particles are prefabricated and have a highly precise size. After annealing, this produces a second porous hydrogen permeable layer 36 that covers the solid layer 34 of palladium alloy. The size of the prefabricated nano-particles used within the second porous hydrogen permeable layer 36 can also be graduated by depositing multiple thick film layers onto the solid layer 34 of palladium alloy. However, the size of the pores in the second porous hydrogen permeable layer 36 that lay against the solid layer 34 of palladium alloy are preferably the same as the pore size in the first porous hydrogen permeable layer 32 immediately adjacent the solid layer 34 of palladium alloy.

The contact of the first porous hydrogen permeable layer 32 and the second porous hydrogen permeable layer 36 with the solid layer 34 of palladium alloy increases the effective surface area of the solid layer 34 that is exposed to hydrogen gas diffusion. The purpose of this increase can be explained by considering the following example. Suppose that the size of the prefabricated nano-particles in both the first porous hydrogen permeable layer 32 and the second porous hydrogen permeable layer 36 have an average diameter d on the surfaces that contact the solid layer 34 of palladium alloy. In an ideal simple cubic lattice of connected nano-particles, the surface area occupied by each powdered particle would be $d^2$. The pore area created by the contact between nano-particles in each layer is $d^2(1-\pi/4)$. Furthermore, the exposed area of each hemisphere of a nano-particle is $d^2(\pi/2)$. The sum of these areas is $d^2(1+\pi/4)$, which equals $1.79\,d^2$. Consequently, the net effect of interposing the deposited solid layer 34 of hydrogen permeable material between porous layers 32, 36 is to increase the effective surface area of the deposited solid layer 34 by seventy-nine percent (79%).

The solid layer 34 of hydrogen permeable material therefore has its surface areas effectively increased by approximately 79% by having the solid layer 34 supported by porous layers 32, 36 of the same hydrogen permeable material.

In FIG. 4 through FIG. 9, the porous layers 32, 36 of hydrogen permeable material were described as being deposited as thick film layers using traditional thick film deposition techniques. Such techniques are preferred if the first and/or second porous layers of hydrogen permeable material are to have graduated particle and pore sizes. However, the first and/or second porous layers of hydrogen permeable material can be manufactured with one consistent particle size and pore size. In such a construction other manufacturing techniques are available.

Figure 10:
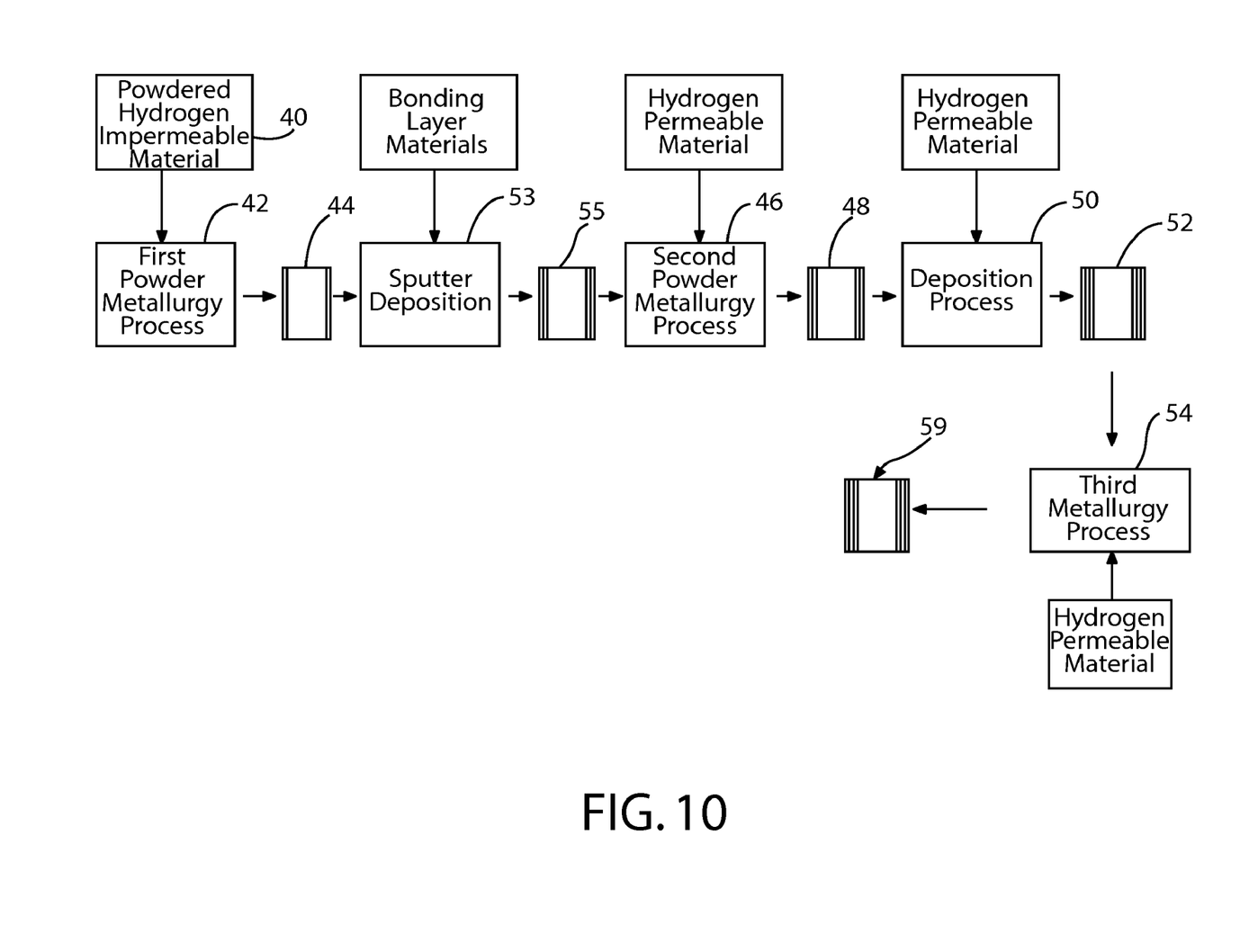
FIG. 10 is a schematic of an alternate manufacturing process used in production of an alternate exemplary embodiment of the present invention.

Referring to FIG. 10, such an exemplary method of manufacture is illustrated. In FIG. 10, the material 40, such as tungsten or stainless steel, that is not hydrogen permeable is provided in powdered form having a known powder particle size. The powdered metal is processed in a first powder metallurgy process 42, where the powder is compressed into a desired form and sintered. The result is a base layer slug 44 having a porous wall.

Bonding layers are then applied to the base layer slug 44 using a repeated sputter deposition process 53. The bonding layers are preferably chromium, tungsten and copper, as has previously been described. This creates a four layer slug 55.

The four layer slug 55 is then sent into a second powder metallurgy process 46. In this second process, pre manufactured and size-filtered particles of hydrogen permeable material are compressed around the four layer slug 55 and is sintered. This creates a five layer slug 48.

The five layer slug 48 is then taken into a deposition process 50, where a solid layer of hydrogen permeable material is deposited around the five layer slug 48, therein creating a six layer slug 52. The deposition process 50 can be any known process by which a thin solid layer of hydrogen permeable material can be deposited onto the five layer slug 48 so as to coat the five layer slug 48.

The six layer slug 52 is then subjected to a third powder metallurgy process 54 where another layer of prefabricated nano-particles of hydrogen permeable material are compressed around the six layer slug 52 and sintered. The result is a complete seven layered composite hydrogen separator 59.

In the manufacturing technique depicted in FIG. 10, prefabricated nano-particles are compacted and sintered to form the porous layers of hydrogen permeable material. The nano-particles need not be homogenous metal dust. Rather, it is possible to provide inert ceramic nano-particles and coat those ceramic nano-particles with palladium alloy or some other hydrogen permeable material. The coated ceramic nano-particles can then be compacted and sintered as though they were homogenous metal powder. The advantages of using coated ceramic nano-particles is that the particle size of the powder can be kept much more consistent than can solid metal powder. Thus, a more consistent pore size can be created in the porous layers.

In the embodiments of the composite hydrogen separator thus illustrated and described, a single solid layer is used. The solid layer is surrounded by a layer of hydrogen permeable material that forms the exterior of the hydrogen separator. Such configurations are merely exemplary and it should be understood that layers within the hydrogen separator can be repeated or eliminated. A composite hydrogen separator with several layers is therefore possible with multiple deposited solid layers disposed between porous layers.

Figure 11:
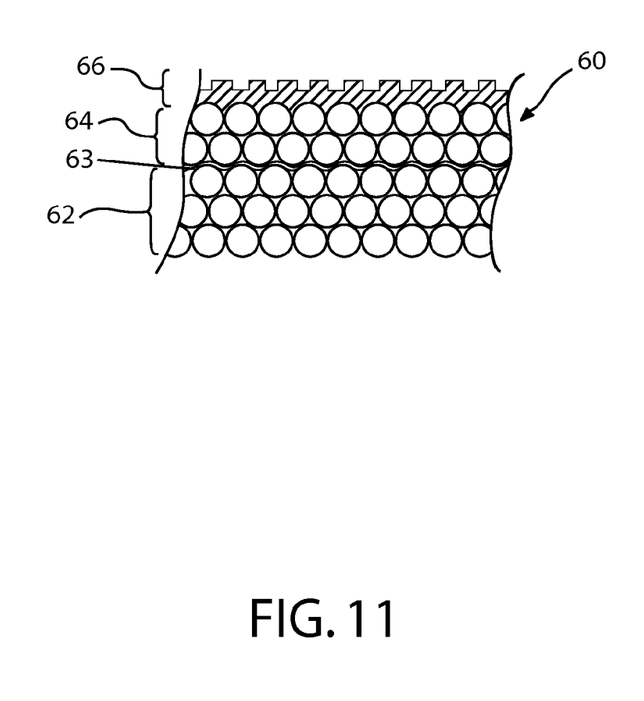
FIG. 11 is a cross-sectional view of an alternate embodiment of a composite hydrogen separator.

In FIG. 11, an alternate embodiment for the wall 60 of a composite hydrogen separator is shown. In this embodiment, the composite wall 60 of the hydrogen separator only has six layers. The six layers are a base layer 62, the three bonding layers 63, a first hydrogen permeable layer 64 and a deposited solid layer 66. The base layer 62, the bonding layers 63 and the first porous hydrogen permeable layer 64 are the same as those previously described. However, the deposited solid layer 66 is now the outermost layer. To increase the surface area of the exterior of the deposited solid layer 66, the exterior of the deposited solid layer 66 is contoured. The contouring can be created by masking sections of the solid layer 66 during deposition or etching the solid layer 66 after deposition. The contouring of the exterior of the deposited solid layer 66 serves to increase the exterior surface area of the solid layer 66, thereby serving the same function as the second hydrogen permeable layer used in previous embodiments. However, it can be seen that the embodiment of FIG. 11 uses less palladium alloy than the previous embodiment's, and is thus less expensive.

In the embodiments of the present invention, the hydrogen separator has been described in the form of a tubular conduit. It will be understood that such an embodiment is merely exemplary. The present invention hydrogen separator can be created in any shape, provided the hydrogen separator acts as a barrier between an area of contaminated hydrogen gas and an area of purified hydrogen gas.

It will be understood that the embodiments of the present invention system and method that are described and illustrated herein are merely exemplary and a person skilled in the art can make many variations to the embodiment shown without departing from the scope of the present invention. All such variations, modifications and alternate embodiments are intended to be included within the scope of the present invention as defined by the appended claims.

What is claimed is:

1. A hydrogen gas separator, comprising:
    a porous base layer made from material that is impermeable to hydrogen;
    a multitude of prefabricated nano-particles of a hydrogen permeable material deposited onto said porous base layer to form first porous layer; and
    a solid layer of said hydrogen permeable material disposed on said first porous layer and in contact with said first porous layer, wherein said first porous layer is interposed between said porous base layer and said solid layer; and
    a second porous layer made of premanufactured nano-particles of hydrogen permeable material, wherein said solid layer of said hydrogen permeable material is interposed between said first porous layer and said second porous layer.

2. The separator according to claim 1, wherein said first porous layer has a pore size that varies as a function of distance from said solid layer.

3. The separator according to claim 1, further including at least one bonding layer disposed between said porous base layer and said first porous layer.

4. The separator according to claim 1, wherein said premanufactured nano-particles in said first porous layer have a predetermined average particle size.

5. The separator according to claim 4, wherein said first porous layer is comprised of multiple thick film layers, wherein each of said thick film layers has premanufactured nano-particles of a different average particle size.

6. The separator according to claim 1, wherein said solid layer of said hydrogen permeable material is a deposition layer that is deposited onto said first porous layer.

7. The separator according to claim 1, wherein said porous base layer is shaped as a tube that defines a central conduit, wherein said first porous layer surrounds said base layer, and said solid layer surrounds said first porous layer.

8. A method of purifying hydrogen gas, comprising the steps of:
    providing a porous base layer;
    providing a multitude of premanufactured nano-particles of a hydrogen permeable material;
    depositing said premanufactured nano-particles onto said porous base layer to form a porous layer of hydrogen permeable material;
    covering said porous layer of hydrogen permeable material with a solid layer of hydrogen permeable material, therein creating a hydrogen permeable structure, wherein said porous layer of hydrogen permeable material and said solid layer of hydrogen permeable material have the same composition;
    exposing said hydrogen permeable structure to gas containing hydrogen gas; and
    causing a pressure differential across the hydrogen permeable structure, wherein said hydrogen gas permeates through said hydrogen permeable structure and is collected.

9. The method according to claim 8, wherein said hydrogen permeable structure is tubular and said step of exposing said hydrogen permeable structure includes passing gas though said hydrogen permeable structure under pressure.

10. A method of manufacturing a hydrogen gas separator, comprising the steps of:
    providing a porous base layer made from material that is impermeable to hydrogen;
    providing a multitude of premanufactured nano-particles of a hydrogen permeable material;
    forming said premanufactured nano-particles into a first porous layer of hydrogen permeable material; and
    depositing a solid layer of said hydrogen permeable material over said first porous layer; and
    forming a second porous layer of said hydrogen permeable material, wherein said solid layer is interposed between said first porous layer and said second porous layer.

11. The method according to claim 10, further including the step of forming contours in said solid layer.

12. The method according to claim 10 further including the step of bonding said first porous layer to said porous base later.

* * * * *